Jan. 23, 1934. W. W. KINCAID 1,944,349
AUTOMATIC GATE
Filed May 28, 1932 2 Sheets-Sheet 1
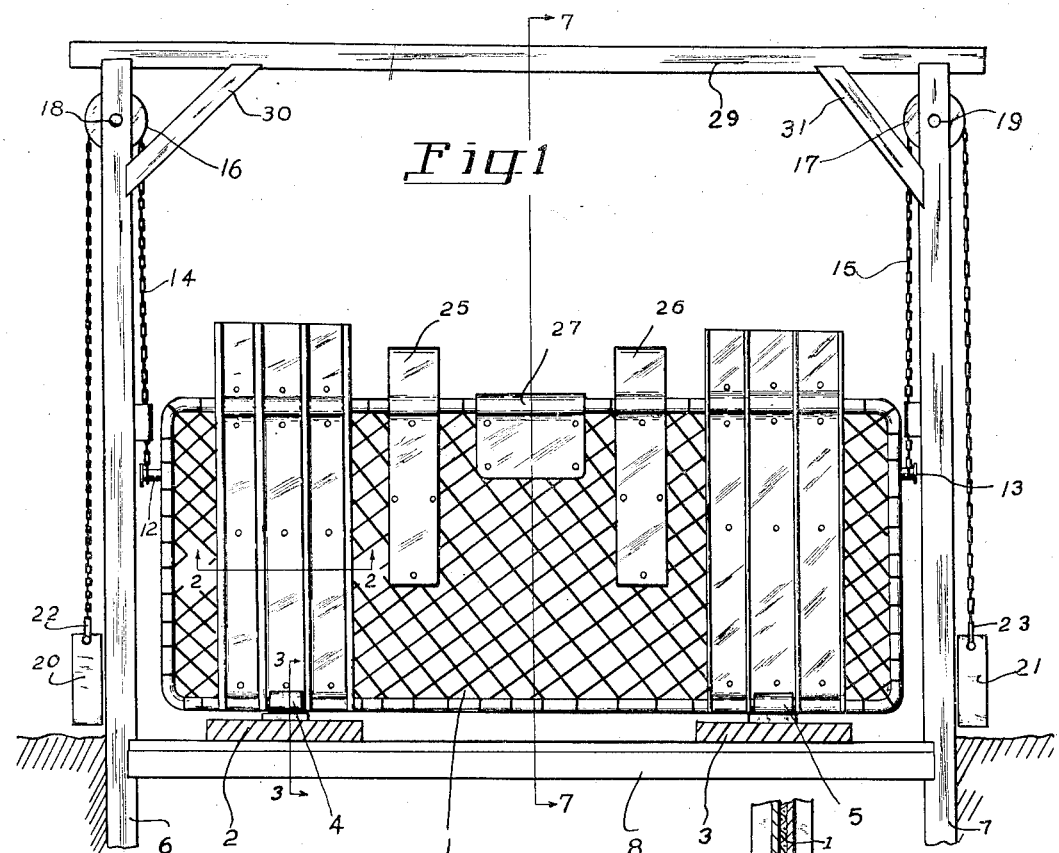
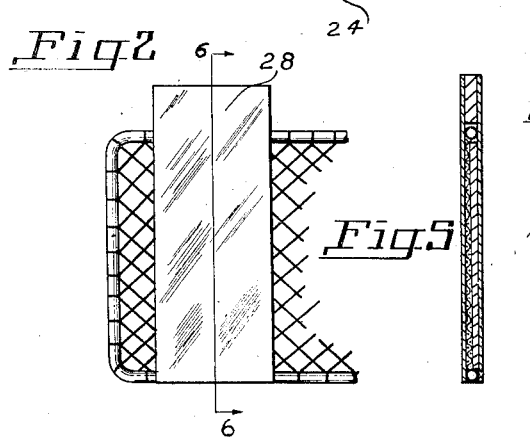
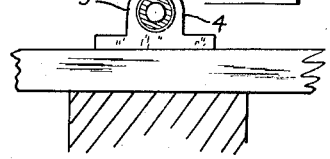
Inventor
WALTER W. KINCAID
By Thomas Bieyer
Attorney Jan. 23, 1934. W. W. KINCAID 1,944,349
AUTOMATIC GATE
Filed May 28, 1932 2 Sheets-Sheet 2
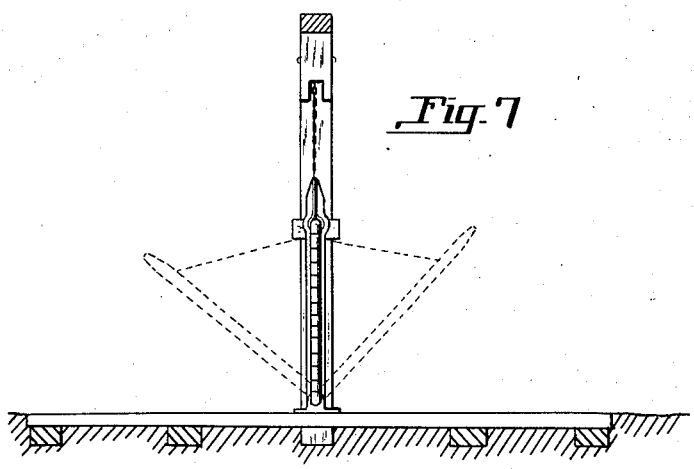
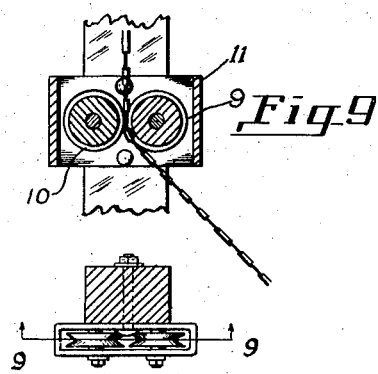
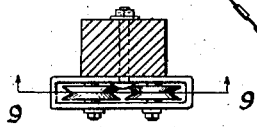
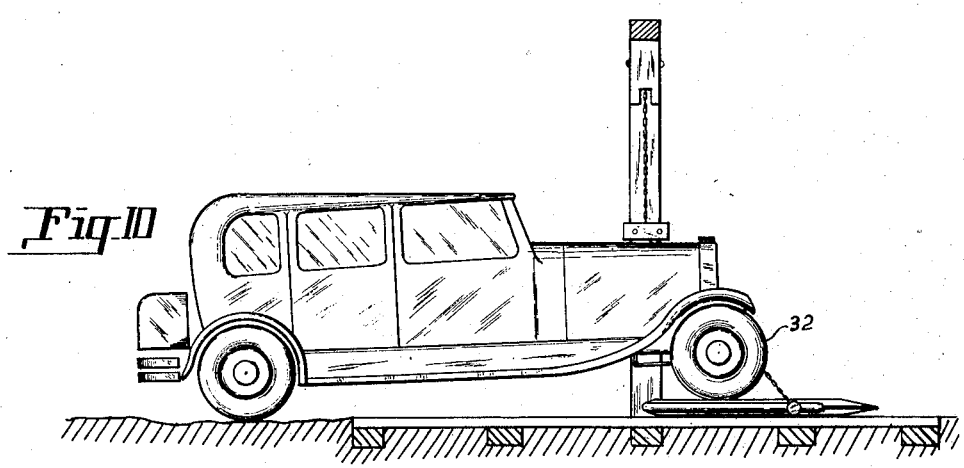
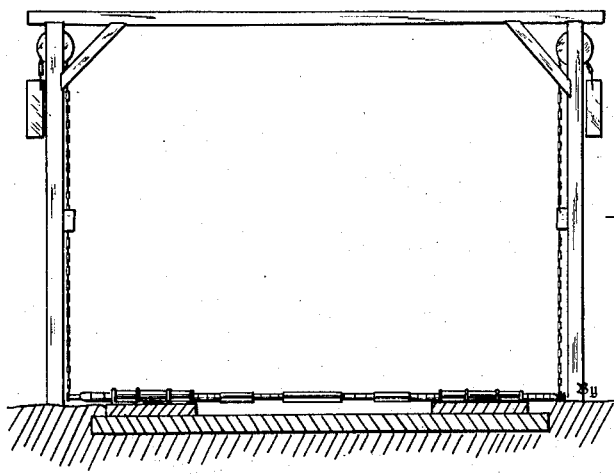
Inventor
WALTER W. KINCAID
Attorney Patented Jan. 23, 1934

1,944,349

UNITED STATES PATENT OFFICE 1,944,349

AUTOMATIC GATE

Walter W. Kincaid, Oakland, Oreg.

Application May 28, 1932. Serial No. 614,169

1 Claim. (Cl. 29—5)

My invention relates to self-closing gates. The invention is comprised primarily of a pair of spaced upright posts. A sill and a cap are associated with the posts. A gate is hingedly secured to the sill and a pair of chains are secured to the opposite ends of the gate frame. The chains pass over pulleys, or sprockets, disposed within the posts and are counterweighted at their free ends to normally maintain the gate in an upright, raised position.

Shoes are disposed at the oppositely disposed sides of the gate. The shoes are adapted for being engaged by the wheels and tires of the vehicle and to prevent injury to the gate itself as the wheels pass thereover. As the vehicle strikes the gate the same is lowered and simultaneously therewith the counterweights are raised. After the vehicle has passed over the gate the counterweights return the gate assembly to normal raised position.

One of the objects of my invention consists in providing a gate that is normally closed and that may be lowered by a vehicle passing thereover and one that will automatically raise after the vehicle has passed thereover to thereby eliminate the necessity of the driver of the vehicle getting out of the vehicle to open and close the gate.

A still further object of my invention consists in providing a self-closing gate that will automatically open when engaged by the vehicle and will close itself, after the vehicle has passed thereover and through the gate.

A still further object of my invention consists in so constructing the gate and its associated elements that it will be comprised of a minimum number of parts and one that may be used over relatively long operating periods with substantial freedom from mechanical operating annoyances.

A still further object of my invention consists in so constructing the same that it may be easily installed by those inexperienced in mechanical devices.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:

Fig. 1 is a front view of a gate in normal, raised position.

Fig. 2 is a fragmentary, sectional end view of the shoes secured to the gate structure. This view is taken on line 2—2 of Fig. 1, looking in the direction indicated.

Fig. 3 is a fragmentary, sectional end view of the gate hinge and of the supporting sleeper. This view is taken on line 3—3 of Fig. 1, looking in the direction indicated.

Fig. 4 is a sectional, end view of the gate, illustrating the gate in a partially lowered position.

Fig. 5 is a fragmentary, sectional side view of the gate illustrating the shoes as being covered by planking, to facilitate the passing of a tractor thereover.

Fig. 6 is a sectional, end view of the mechanism illustrated in Fig. 5. This view is taken on line 6—6 of Fig. 5, looking in the direction indicated.

Fig. 7 is a sectional, end view of the gate and post structure, the same is taken on line 7—7 of Fig. 1, looking in the direction indicated.

Fig. 8 is a sectional, end view of one of the posts and illustrating guide pulleys secured upon the inside of each of the posts.

Fig. 9 is a sectional side view of the mechanism illustrated in Fig. 8. This view is taken on line 9—9 of Fig. 8, looking in the direction indicated.

Fig. 10 is a sectional side view of the gate illustrating a motor vehicle as being used in opening the same.

Fig. 11 is a side view of the gate illustrating the gate in full lowered position.

Like reference characters refer to like parts throughout the several views.

I provide a gate 1 of any suitable material. I provide sleepers 2 and 3 that run transversely of the gate and I hingedly secure the gate to the sleepers by any suitable hinging means 4 and 5. In the erection of the gate I place posts 6 and 7 in the ground and space the same apart sufficiently to provide the proper manipulation of the gate therebetween.

I preferably place one or more sills 8 transversely of the roadway. One of said sills being secured to the posts 6 and 7 respectively. A pair of guide pulleys 9 and 10 are placed within a suitable housing 11, and I secure one of these to the inside of each of the posts. Wrist pins 12 and 13 are secured to the frame of the gate and counterweighted lines 14 and 15 are secured to the wrist pins by any suitable connections. These lines may be made of rope, either fabric, metal or chain.

Pulleys 16 and 17 are placed within the upper ends of the posts and each of these pulleys are rotatably disposed about journal pins 18 and 19.

The counterweighted lines are passed about the respective pulleys, and counterweights 20 and 21 are secured to the free ends of the lines.

I have found suitable results may be obtained by the forming of these counterweights of metal pipe having a closed end with suitable bails 22 and 23 being disposed between the counterweight and the line.

In order to protect the gate structure and to reinforce the same, I place metal shoes upon the oppositely disposed sides of the gate. These metal shoes are preferably made of sheet metal, having spaced ribs 24 running longitudinally of the shoe to form tracks between the ribs over which the tires and wheels of the vehicle may be made to pass. These shoes are placed in registerable alignment with each other and upon the oppositely disposed sides of the gate. The shoes are preferably placed upon the gate so as to register with the sleepers 2 and 3 when the gate is lowered to permit the vehicle passing thereover.

These shoes are preferably made longer than the heighth of the gate in order that the gate may be held down as the vehicle passes thereover.

Spring engaging bumper plates 25 and 26 are placed upon the gate so that, as the wheels leave the shoes, the plates may be made to ride the springs until the vehicle has entirely passed the gate assembly.

A bumper block 27 may be placed central of the gate which may be made to engage the frame, rear axle or other engaging impediments disposed upon the lower sides of the vehicle structure.

For the passing of heavy machinery, as tractors and trucks, over the gates, suitable planking 28 may be placed over the shoes when the load justifies the same. A cap 29 may be placed over the posts and suitable braces 30 and 31 be placed between the posts and the cap.

In the operation of my device the front wheels 32 of the vehicle are made to engage the gate and the propelling of the vehicle lowers the gate, at which time the front wheels pass thereover and the gate is maintained in a repressed position until the vehicle has entirely passed thereover, thereafter the counterweights raise the gates to normal raised position.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim.

What I claim is:

In a device of the class described, the combination of a frame member formed with a pair of uprights and reinforcing cross bars interconnecting the tops and bottom thereof, a gate hingedly mounted along its lower edge to the lower end of the frame, pulleys rotatably mounted near the upper end of the frame, chains trained about said pulleys and having their one end connected with the upper end of the gate and their opposite end connecting with weights to normally maintain the gate in an upright position with respect to the frame, spaced apart corrugated tread plates arranged transversely of the gate and extending to a point beyond its upper edge, bumper plates disposed between the tread plates adapted for wiping contact with the understructure of a vehicle, another bumper plate disposed between the first mentioned bumper plates and also adapted for wiping contact with the understructure of a vehicle.

WALTER W. KINCAID.